United States Patent
Colberg et al.

(10) Patent No.: US 10,214,292 B2
(45) Date of Patent: Feb. 26, 2019

(54) COOLING SYSTEM USING CHILLER AND THERMALLY COUPLED COOLING CIRCUIT

(75) Inventors: Carsten Colberg, Hamburg (DE); Torge Pfafferott, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1672 days.

(21) Appl. No.: 12/162,869

(22) PCT Filed: Jan. 26, 2007

(86) PCT No.: PCT/EP2007/000702
§ 371 (c)(1),
(2), (4) Date: Aug. 6, 2008

(87) PCT Pub. No.: WO2007/088012
PCT Pub. Date: Aug. 9, 2007

(65) Prior Publication Data
US 2009/0000329 A1    Jan. 1, 2009

(30) Foreign Application Priority Data

Feb. 3, 2006  (DE) .......................... 10 2006 005 035

(51) Int. Cl.
*F25B 25/00*   (2006.01)
*B64D 13/00*   (2006.01)
(Continued)

(52) U.S. Cl.
CPC ............ *B64D 13/00* (2013.01); *F25B 25/005* (2013.01); *F25B 40/00* (2013.01);
(Continued)

(58) Field of Classification Search
CPC ............ F25B 25/005; F25B 2313/0233; F25B 2313/02331
(Continued)

(56) References Cited

U.S. PATENT DOCUMENTS 3,477,243 A * 11/1969 Schroeder et al. .. B65D 88/745
62/237
5,245,836 A    9/1993 Lorentzen et al.
(Continued)

FOREIGN PATENT DOCUMENTS

DE    1 601 874    2/1971
DE    43 40 317    6/1995
(Continued)

OTHER PUBLICATIONS

English translation of Russian Office Action for Publication. No. SU 1416819 A1.
(Continued)

*Primary Examiner* — Ned Landrum
*Assistant Examiner* — Daniel C Comings
(74) *Attorney, Agent, or Firm* — Carter, DeLuca, Farrell & Schmidt, LLP

(57) ABSTRACT

A cooling system suitable for cooling food on board an aircraft is provided which includes a chiller device and a first cooling circuit which is adapted to feed cooling energy generated by the chiller device to at least one cooling station, the chiller device includes a second cooling circuit formed separately from the first cooling circuit and is thermally coupled to the first cooling circuit.

10 Claims, 4 Drawing Sheets

Figure 1:
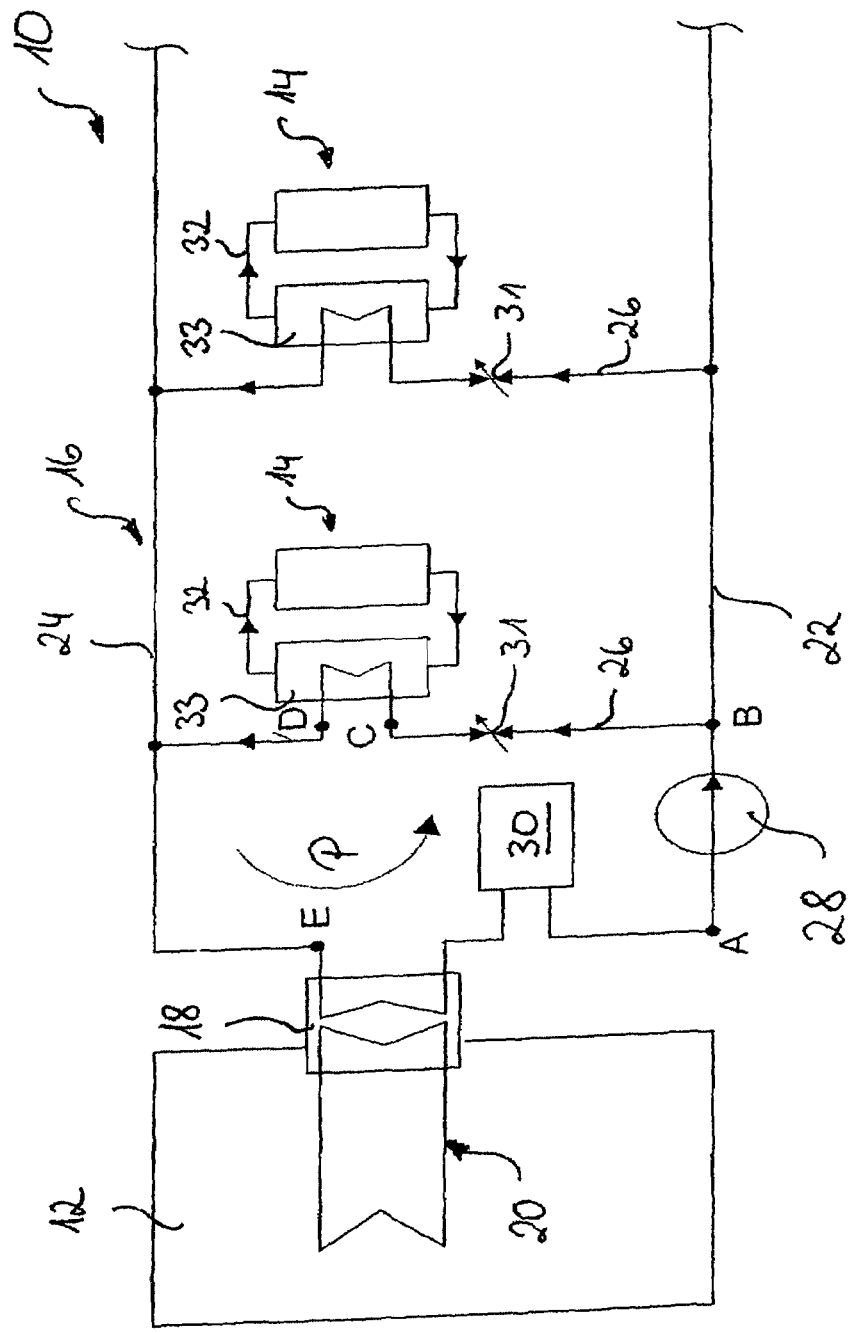

(51) Int. Cl.
*F25B 40/00* (2006.01)
*B64D 13/06* (2006.01)
*F25B 9/00* (2006.01)
*F25D 17/02* (2006.01)

(52) U.S. Cl.
CPC ............ *B64D 2013/0629* (2013.01); *B64D 2013/0674* (2013.01); *F25B 9/008* (2013.01); *F25B 2309/061* (2013.01); *F25B 2313/0233* (2013.01); *F25B 2313/02331* (2013.01); *F25D 17/02* (2013.01); *Y02T 50/44* (2013.01)

(58) Field of Classification Search
USPC ............... 62/335, 239, 244, 513, 237, 419
See application file for complete search history.

(56) References Cited

U.S. PATENT DOCUMENTS

| | | | |
|---|---|---|---|
| 5,265,437 A * | 11/1993 | Saperstein et al. | 62/243 |
| 5,743,102 A * | 4/1998 | Thomas | A47F 3/04 165/219 |
| 6,131,401 A * | 10/2000 | Ueno et al. | 62/175 |
| 6,237,356 B1 * | 5/2001 | Hori et al. | 62/324.1 |
| 6,324,856 B1 * | 12/2001 | Weng | 62/335 |
| 6,880,351 B2 * | 4/2005 | Simadiris et al. | 62/434 |
| 7,526,924 B2 * | 5/2009 | Wakamoto et al. | 62/335 |
| 2003/0042361 A1 | 3/2003 | Simadiris et al. | |
| 2004/0261449 A1 * | 12/2004 | Memory et al. | 62/513 |
| 2005/0210910 A1 * | 9/2005 | Rigney et al. | 62/506 |
| 2006/0266075 A1 * | 11/2006 | Itsuki | F25B 1/10 62/512 |
| 2008/0156007 A1 * | 7/2008 | Cur | F25B 5/02 62/175 |

FOREIGN PATENT DOCUMENTS

| | | | |
|---|---|---|---|
| FR | 2 737 000 | 1/1997 | |
| JP | 08028974 A | 2/1996 | |
| JP | 2003065618 A | 3/2003 | |
| SU | 1267128 A1 | 10/1986 | |
| SU | 1416819 A1 | 8/1988 | |
| WO | 90/07683 | 7/1990 | |
| WO | 00/65287 | 11/2000 | |
| WO | WO 2005/052467 A1 * | 6/2005 | ............... F25B 1/00 |
| WO | 2005/094346 A2 | 10/2005 | |

OTHER PUBLICATIONS

English translation for Decision to Grant for SU 1267128 A1 dated Nov. 19, 2010.
International Search Report, dated Jun. 18, 2007.

\* cited by examiner

COOLING SYSTEM USING CHILLER AND THERMALLY COUPLED COOLING CIRCUIT

The invention relates to a cooling system, in particular for cooling food on board an aircraft, having the features which are mentioned in the preamble of Claim 1.

A cooling system of this kind is known from DE 43 40 317 A1 and serves, for example, to cool food which is stored on board a passenger aircraft and intended for distribution to the passengers. The food with which the passengers are to be provided is typically kept in mobile transport containers. These transport containers are equipped and pre-cooled outside of the aircraft and, after being loaded onto the aircraft, set down at appropriate deposit locations in the aircraft passenger compartment, for example in the on-board kitchens.

In order to ensure that the food remains fresh until it is distributed to the passengers, cooling stations are provided in the region of the transport container deposit locations, these stations being supplied with cooling energy by a central chiller device and this cooling energy being delivered to the transport containers with the food stored therein. As compared with chiller units which are formed separately at the individual transport container deposit locations, a cooling system with a central chiller device has the advantages of a smaller installation volume as well as a lower weight and, moreover, requires less assembly and maintenance expenditure. Furthermore, when using a cooling system with a central chiller device disposed outside of the passenger compartment, machine noises which are generated by chiller units positioned in the region of the transport container deposit locations and which can be heard in the aircraft passenger compartment and therefore experienced as disturbing can be avoided.

In the case of the cooling system which is known from DE 43 403 17 A1 the central chiller device is thermally coupled to the individual cooling stations via a cooling circuit. The cooling circuit comprises a feed line as well as a withdrawal line in which a refrigerant is circulated. The feed line connects the central chiller device to the individual cooling stations in order to feed refrigerant cooled to an appropriately low temperature by the central chiller device and therefore cooling energy to the cooling stations. On the other hand, refrigerant which has been heated through the delivery of cooling energy to the cooling stations is returned from the cooling stations to the central chiller device via the withdrawal line. The feed and the withdrawal line are in each case directly connected to the central chiller device, so that the line system of the cooling circuit is automatically subjected to the high pressure prevailing in the central chiller device.

In particular when the cooling system is designed for two-phase operation, i.e. when the refrigerant is converted from the liquid to the gaseous state when cooling energy is delivered to the cooling stations and must then be returned to the liquid state again through appropriate pressure and temperature control in the cooling circuit, high pressure and temperature differences thus occur in the line system, which is directly connected to the central chiller device, of the cooling circuit. The line system is consequently subject to significant thermal and mechanical loads and must be designed accordingly. This results in an increase in the weight as well as in the volume of the lines, which has disadvantageous consequences in particular when the cooling system is used on board an aircraft. Moreover, a cooling system in whose cooling circuit high pressures prevail has disadvantages in safety terms. Finally, the maintenance of a system of this kind requires more time and therefore costs.

US 2003/0042361 A1 discloses a system for cooling food which is kept in mobile trolleys in the on-board kitchens of an aircraft. A fan as well as a heat exchanger, through which a first refrigerant flows, are provided in the on-board kitchens. Air is routed over the heat exchanger by means of the fan, cooled in the process and then fed to the food which is to be cooled. The first refrigerant is circulated in a first cooling circuit and cooled by means of a refrigerating machine to the desired low temperature. A second cooling circuit, separated from the first cooling circuit, is provided in the refrigerating machine. The cooling energy which is generated by the refrigerating machine is transferred from the second to the first cooling circuit by means of a further heat exchanger.

FR 27 37 000 A1 describes a system for cooling food in which coolant is fed to individual cooling stations from a central reservoir. A heat exchanger, which is in thermal contact with a cooling circuit of a refrigerating machine, serves to cool the coolant in the central reservoir.

DE 1 601 874 OS discloses a cooling system in which a cooling container is connected to an external refrigerating source via a first heat exchanger. The external refrigerating source comprises a condenser, a compressor, an evaporator as well as a collecting container. The cooling energy is transferred to the container by means of further heat exchangers which are connected to the first heat exchanger via pipelines.

The object of the invention is to provide a cooling system which is in particular suitable for cooling food on board an aircraft, is improved in terms of safety and has a low weight as well as a low volume.

In order to achieve the above-mentioned object, given a cooling system according to the invention with a chiller device and a first cooling circuit which is adapted to feed cooling energy generated by the chiller device to at least one cooling station, the chiller device comprises a second cooling circuit which is formed separately from the first cooling circuit. The second cooling circuit of the chiller device is thermally coupled to the first cooling circuit of the cooling system. In other words, in the case of the cooling system according to the invention the first cooling circuit, in which, for example, a first refrigerant can be circulated in order to feed cooling energy generated by the chiller device to the at least one cooling station, is no longer directly connected to the central chiller device. Instead the first cooling circuit and the second cooling circuit formed in the chiller device are just thermally coupled. This can effectively prevent the line system of the first cooling circuit from being subjected to the pressure prevailing in the central chiller device, which may be very high. The pressure and temperature differences occurring in the line system of the first cooling circuit may consequently be considerably reduced.

In the cooling system according to the invention the thermal and mechanical loads to which the line system of the first cooling circuit is subject during operation of the cooling system are therefore distinctly reduced when compared with systems known from the prior art. A cooling circuit design which is adapted to the reduced thermal and mechanical loads of the line system therefore permits weight and volume reductions which have positive effects in particular when the cooling system according to the invention is used on board an aircraft and result in a lowering of the production and operating costs. Moreover, when compared with systems known from the prior art, the cooling system according to the invention is distinguished by increased operating safety on account of the reduced pressure in the first cooling circuit. Finally, due to the first and second cooling circuits being formed independently of one another, the system according to the invention enables assembly and maintenance work to be simplified.

The first cooling circuit of the cooling system according to the invention can be connected to just one cooling station disposed, for example, in the region of an on-board kitchen in the passenger compartment of the aircraft. However, the first cooling circuit of the cooling system according to the invention may also be adapted to supply a plurality of cooling stations, which may be distributed in the passenger compartment of the aircraft, with cooling energy which is generated by the chiller device. In the latter case the first cooling circuit then preferably comprises a feed line via which a first refrigerant which is cooled by a central chiller device to the required temperature can be routed in the direction of the individual cooling stations, as well as a withdrawal line via which the first refrigerant which is heated by the cooling energy transfer to the cooling stations can again be returned in the direction of the central chiller device. The individual cooling stations may be connected to the feed or the withdrawal line of the first cooling circuit via corresponding branch lines, for example.

In the case of the cooling system according to the invention a cooling device for lowering the temperature of a second refrigerant circulating in the second cooling circuit is disposed in the second cooling circuit. Various types of coolers may be used as the cooling device. For example, devices in which ambient (dynamic) air is used as the heat sink may be used.

A heat exchanger is disposed in the second cooling circuit of the chiller device. The heat exchanger thermally couples a portion of the second cooling circuit which extends upstream of the cooling device to a portion of the second cooling circuit which extends downstream of the cooling device.

A delivery device for circulating the refrigerant in the second cooling circuit is preferably also disposed in the second cooling circuit provided in the chiller device of the cooling system according to the invention. The delivery device may be in the form of a compressor, for example. $CO_2$ or R134A ($CH_2$—$CF_3$) is preferably used as the second refrigerant. Generally speaking, the same refrigerant, i.e. $CO_2$ or R134A ($CH_2$—$CF_3$), for example, can be used for the first and the second refrigerant. However, it is also possible to operate the first and the second cooling circuit with different refrigerants.

The second refrigerant which is heated by the cooling energy transfer from the second cooling circuit to the first cooling circuit therefore firstly flows through the heat exchanger before it enters the delivery device and the cooling device. As it passes through the heat exchanger the second refrigerant flowing through the portion of the second cooling circuit which extends upstream of the cooling device and the delivery device absorbs heat, i.e. it undergoes a further rise in temperature. It is thereby possible to ensure, in particular when $CO_2$ is used as the second refrigerant, that the second refrigerant is fed to the cooling device and the delivery device in the gaseous state.

After emerging from the heat exchanger, the second refrigerant which is heated in the heat exchanger can be routed by the delivery device into the cooling device and cooled here to the desired temperature. Finally, second refrigerant emerging from the cooling device and flowing through the portion of the second cooling circuit which extends downstream of the cooling device is routed through the heat exchanger before it comes into thermal contact with the first cooling circuit. In the heat exchanger the second refrigerant flowing through the portion of the second cooling circuit which extends downstream of the cooling device undergoes further cooling through heat transfer to the second refrigerant flowing through the portion of the second cooling circuit which extends upstream of the cooling device and the delivery device. The heat exchanger therefore also ensures that the second refrigerant flowing through the portion of the second cooling circuit which extends downstream of the cooling device is at the desired low temperature before the cooling energy which is stored in the second refrigerant is transferred to the first cooling circuit.

In a preferred embodiment of the cooling system according to the invention the second cooling circuit is thermally coupled to the first cooling circuit via a further heat exchanger. The further heat exchanger permits optimum cooling energy transfer from the second cooling circuit of the chiller device to the first cooling circuit of the cooling system. The further heat exchanger may be formed integral with the chiller device or formed as a separate component.

In a further preferred embodiment of the cooling system according to the invention the first refrigerant circulating in the first cooling circuit is selected such that it can be converted from the liquid to the gaseous state when its cooling energy is delivered to the at least one cooling station and then returned to the liquid state again through appropriate pressure and temperature control in the first cooling circuit. $CO_2$ or R134A ($CH_2$—$CF_3$), for example, may be used as the first refrigerant. A two-phase operation of this kind of the cooling system according to the invention is particularly favourable in energy terms and can be implemented without problems through the configuration according to the invention of the cooling system with a second chiller device cooling circuit formed separately from the first cooling circuit.

A delivery device for circulating the first refrigerant in the first cooling circuit is preferably disposed in the first cooling circuit of the cooling system according to the invention. The delivery device is preferably in the form of a pump and integrated into the feed line of the first cooling circuit via which the first refrigerant which is cooled by the chiller device to the required temperature is routed in the direction of the cooling station or the cooling stations.

In a preferred embodiment of the cooling system according to the invention a first reservoir for temporarily storing the first refrigerant is disposed in the first cooling circuit. The reservoir is preferably positioned upstream of the delivery device in the feed line of the first cooling circuit. During operation of the cooling system according to the invention the first refrigerant can then be delivered by the delivery device from the first reservoir. The first reservoir is preferably provided with appropriate insulation in order to maintain the first refrigerant which is temporarily stored in the first reservoir at the desired temperature. The first reservoir may in addition also be formed such that the first refrigerant can be maintained at a specific, for example raised pressure level.

A throttle valve is preferably disposed in the first cooling circuit. The throttle valve regulates the flow rate of the first refrigerant through the first cooling circuit. Moreover, the throttle valve may also be used to regulate the pressure and therefore the evaporation temperature of the first refrigerant in the first cooling circuit.

If the cooling system according to the invention comprises only one cooling station, just one throttle valve is preferably disposed in the first cooling circuit. The throttle valve is then, for example, disposed downstream of the delivery device in the feed line of the first cooling circuit via which the first refrigerant which is cooled by the chiller device to the appropriate temperature is fed to the cooling station. The throttle valve then serves to regulate the inflow rate of the first refrigerant to the associated cooling station. Moreover, the throttle valve may also serve to regulate the pressure and therefore the evaporation temperature of the first refrigerant when cooling energy is delivered to the cooling station.

If, on the other hand, the cooling system according to the invention comprises a plurality of cooling stations, a number of throttle valves corresponding to the number of cooling stations is preferably provided. The throttle valves then regulate the inflow of the first refrigerant to the individual cooling stations and are disposed, for example, in corresponding branch lines which connect the feed line of the first cooling circuit to the respective cooling stations. The throttle valves may also be used to regulate the pressure and therefore to regulate the evaporation temperature of the first refrigerant when cooling energy is delivered to the cooling stations.

The throttle valve/throttle valves may also be formed such that it/they are capable of completely suppressing the flow of the first refrigerant through the throttle valve/throttle valves. The feed of the first refrigerant to a corresponding cooling station can thereby be interrupted or restored in a simple manner by closing or opening the throttle valve. This is of advantage in particular in a cooling system which comprises a plurality of cooling stations, as then the first refrigerant and therefore cooling energy can be fed to individual cooling stations, while other cooling stations can be isolated from the first cooling circuit in a simple manner.

A second reservoir for temporarily storing the second refrigerant is preferably disposed in the second cooling circuit of the chiller device. The second reservoir is positioned, for example, upstream of the second delivery device in the second cooling circuit, so that the delivery device can deliver the second refrigerant which is temporarily stored in the second reservoir from the second reservoir.

In a preferred embodiment of the cooling system according to the invention the cooling station has a third cooling circuit which is formed separately from the first cooling circuit and is thermally coupled to the first cooling circuit. In the case of a design of this kind the third cooling circuit may advantageously be isolated from the pressure prevailing in the first cooling circuit. Moreover, it is easier to carry out maintenance work on individual components of the system.

In a preferred embodiment of the cooling system according to the invention the third cooling circuit is thermally coupled to the first cooling circuit via a third heat exchanger. The third heat exchanger permits optimum cooling energy transfer from the first cooling circuit of the cooling system to the third cooling circuit of the cooling station.

The third heat exchanger is preferably formed as an evaporation device. The first refrigerant flowing through the first cooling circuit is then converted from the liquid to the gaseous state upon delivering its cooling energy to the cooling station. The first refrigerant is then returned to the liquid state again through appropriate temperature and pressure control in the first cooling circuit. A two-phase operation of this kind of the cooling system according to the invention is particularly favourable in energy terms and can be implemented without problems through the configuration according to the invention of the cooling system.

If the cooling system according to the invention comprises a plurality of cooling stations, these cooling stations are in each case provided with a third cooling circuit, each third cooling circuit being thermally coupled to the first cooling circuit via a corresponding third heat exchanger, which is preferably formed as an evaporation device.

Figure 2:
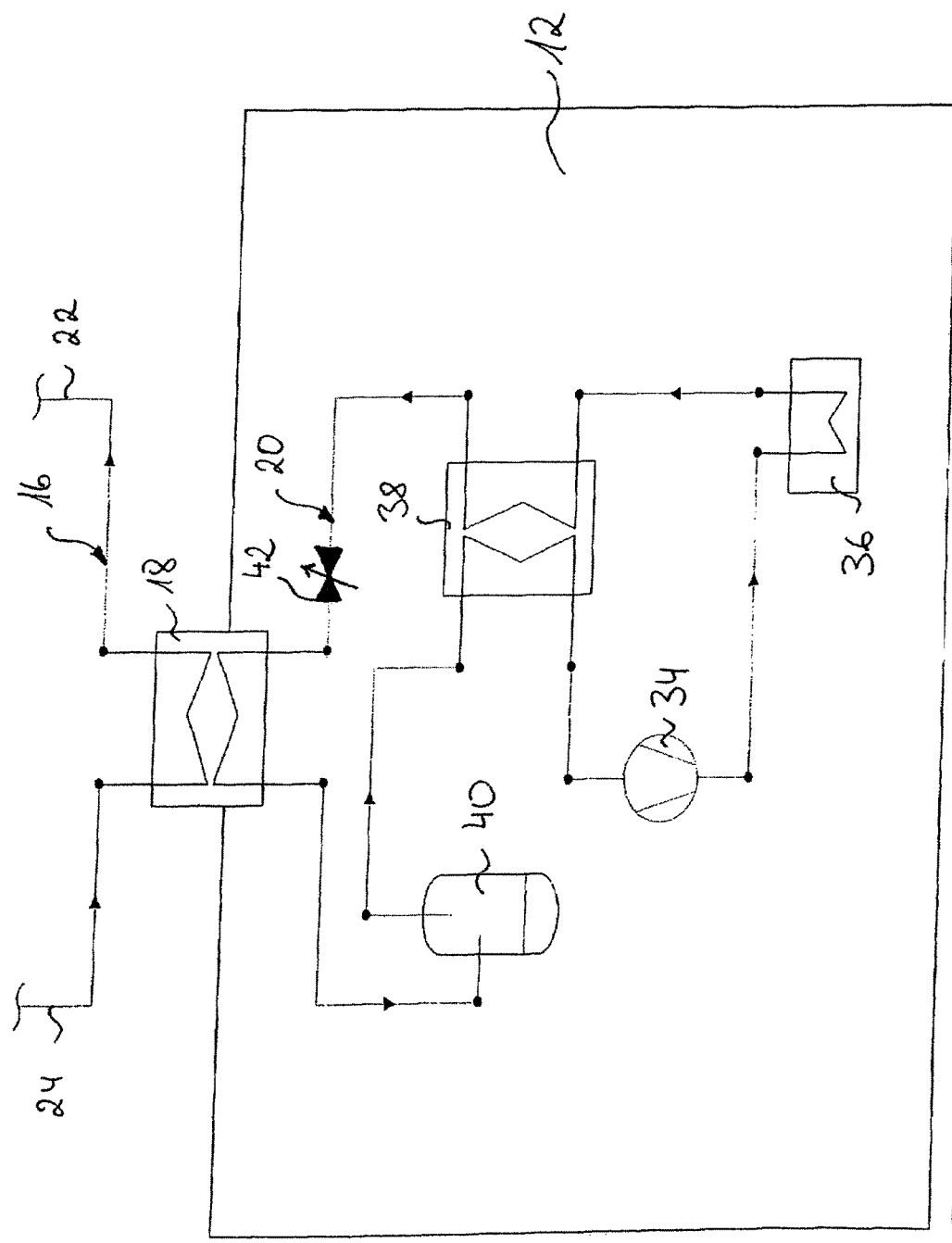
Figure 3:
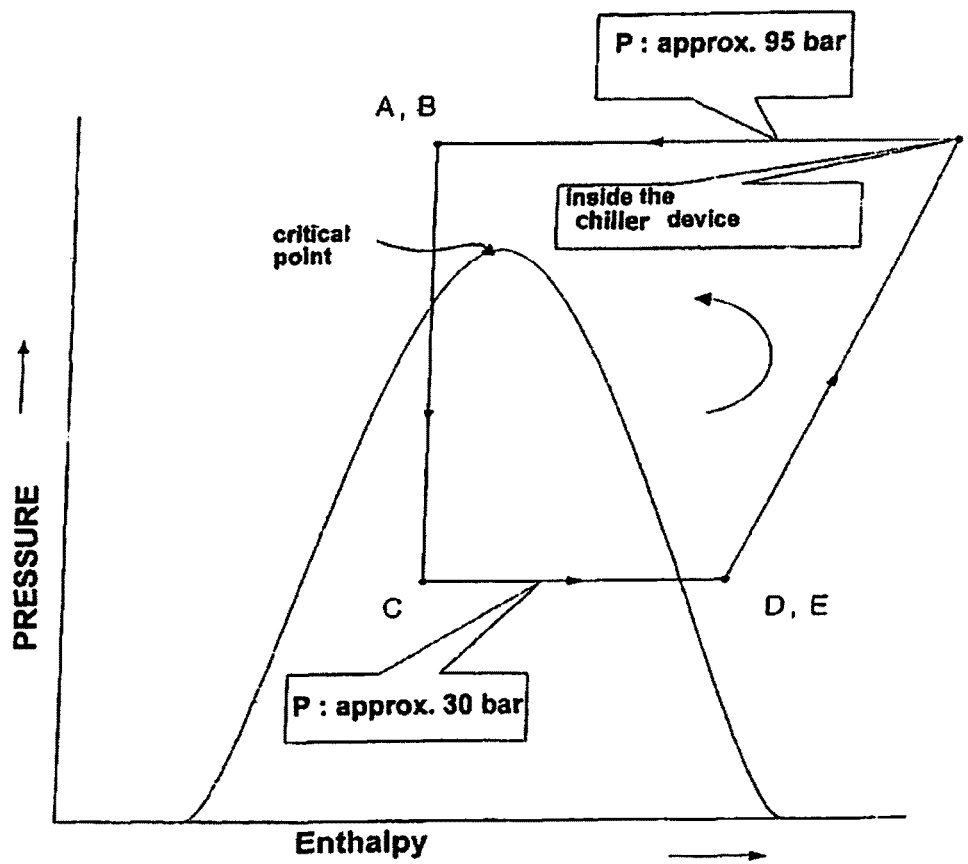
Figure 4:
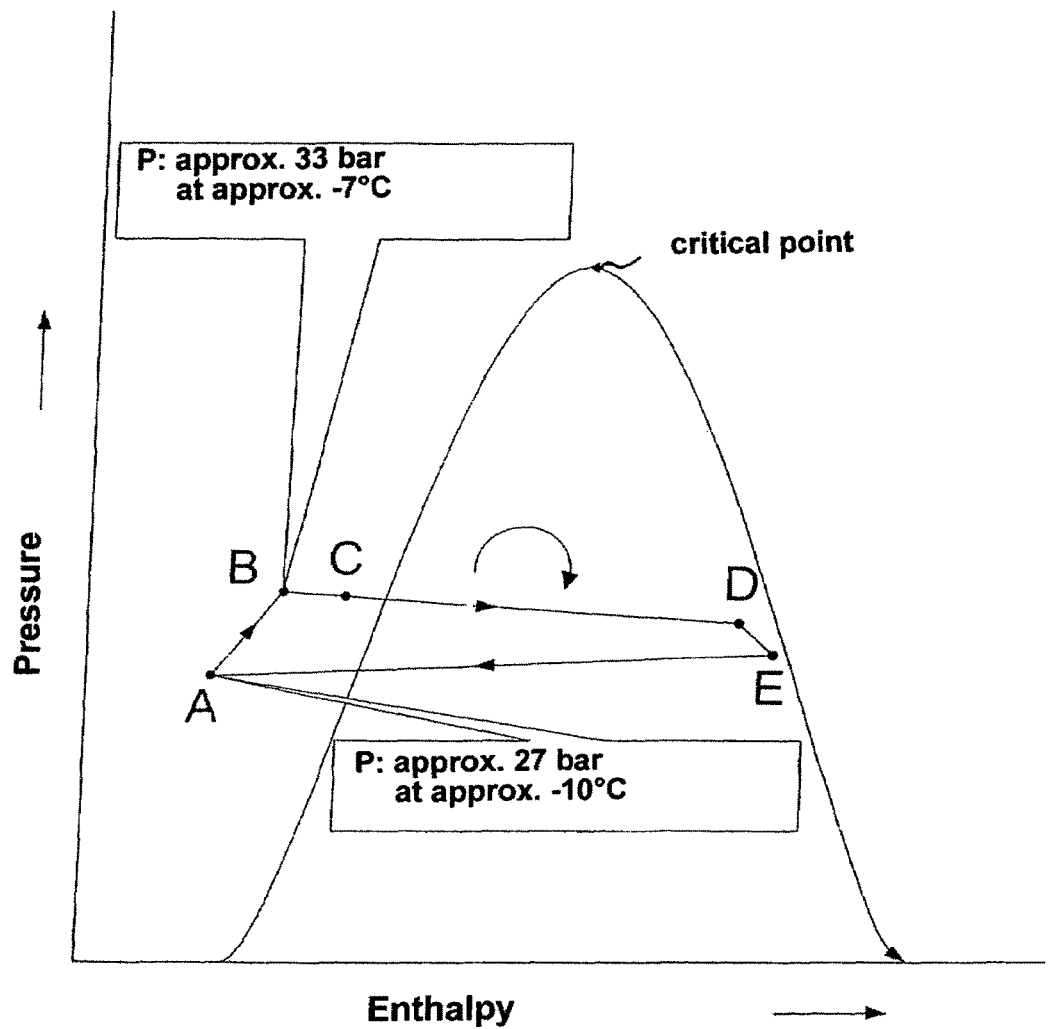

A preferred embodiment of a cooling system according to the invention is now illustrated in detail on the basis of the accompanying schematic drawings, of which:

FIG. 1 shows a cooling system according to the invention,

FIG. 2 is an enlarged representation of a chiller device which is used in the cooling system according to the invention as shown in FIG. 1, FIG. 3 is a representation of the refrigeration process control in a cooling system known from the prior art in a pressure-enthalpy diagram using $CO_2$ as the first refrigerant and FIG. 4 is a representation of the refrigeration process control in a cooling system according to the invention in a pressure-enthalpy diagram using $CO_2$ as the first refrigerant.

FIG. 1 shows a cooling system 10 which is provided to cool food provided on board a passenger aircraft for distribution to the passengers and stored in mobile transport containers. The cooling system 10 comprises a central chiller device 12 as well as a plurality of cooling stations 14 which are distributed in the region of the on-board kitchens at respective deposit locations of the transport containers in the passenger compartment of the aircraft. In order to supply the cooling stations 14 with cooling energy, a first cooling circuit 16 is provided, through which a first refrigerant, as indicated by the arrow P, flows anticlockwise. $CO_2$ is used as the first refrigerant.

The first cooling circuit 16 of the cooling system 10 is thermally coupled to a second cooling circuit 20 of the chiller device 12 via a first heat exchanger 18. Otherwise the first and the second cooling circuit 16, 20 are formed separately from one another, so that the first cooling circuit 16 is not subjected to the pressure prevailing in the second cooling circuit 20, which may be very high, during operation of the cooling system 10.

The first cooling circuit 16 comprises a feed line 22, a withdrawal line 24 as well as a plurality of branch lines 26, the branch lines 26 in each case serving to connect the individual cooling stations 14 to the feed or the withdrawal line 22, 24 of the first cooling circuit 16.

A first delivery device 28, which is in the form of a pump, is disposed in the feed line 22 of the first cooling circuit 16 and serves to deliver the first refrigerant from a first reservoir 30, which is disposed upstream of the delivery device 28 in the first cooling circuit 16, and to circulate it in the first cooling circuit 16. The first reservoir 30 is provided with appropriate insulation, so that the first refrigerant which is temporarily stored in the first reservoir 30 can be maintained at the desired low temperature.

A throttle valve 31 is disposed in each branch line 26 connecting the feed line 22 of the first cooling circuit 16 to the individual cooling stations 14, which valve 31 serves to control the flow rate of the first refrigerant in the direction of each cooling station 14 as well as the pressure in the first refrigerant upstream of each cooling station 14. If required, each throttle valve 31 is capable of completely interrupting the flow of the first refrigerant through the corresponding branch line 26 and therefore stopping the feed of the first refrigerant to the cooling station 14 disposed downstream of the throttle valve 31. Individual cooling stations 14 can thereby be isolated from the first cooling circuit 16 in a simple manner, while other cooling stations 14 continue to be fed with cooling energy.

Each cooling station 14 has a third cooling circuit 32 which is formed separately from the first cooling circuit 16 and is thermally coupled to the first cooling circuit 16 via a heat exchanger 33. The heat exchanger 33 is formed as an evaporation device, so that the first refrigerant flowing through the first cooling circuit 16 is converted from the liquid to the gaseous state when its cooling energy is delivered to the cooling station 14. After emerging from the heat exchanger 33, the first refrigerant is returned to the liquid state again through appropriate temperature and pressure control in the first cooling circuit 16.

As can be seen from FIG. 2 of the accompanying drawings, a second delivery device 34 in the form of a compressor is disposed in the second cooling circuit 20 of the chiller device 12, this serving to circulate a second refrigerant in the second cooling circuit 20. $CO_2$ is used as the second refrigerant. A cooling device 36, which is formed as a gas cooler, is disposed in the second cooling circuit 20 of the chiller device 12 downstream of the second delivery device 34. The cooling device 36, in which ambient dynamic air is used as the heat sink, serves to cool the second refrigerant circulating in the second cooling circuit 20 to the required low temperature.

A second heat exchanger 38 is also disposed in the second cooling circuit 20 of the chiller device 12. The second heat exchanger 38 thermally couples a portion of the second cooling circuit 20 which extends upstream of the second delivery device 34 to a portion of the second cooling circuit 20 which extends downstream of the cooling device 36. As a result of disposing the second heat exchanger 38 in the second cooling circuit 20, the second refrigerant which is heated by the cooling energy transfer from the second cooling circuit 20 to the first cooling circuit 16 in the first heat exchanger 18 firstly flows through the second heat exchanger 38 before it enters the second delivery device 34 and the cooling device 36. As it passes through the second heat exchanger 38 the second refrigerant, which flows through the portion of the second cooling circuit 20 which extends upstream of the second delivery device 34, absorbs heat and therefore undergoes a rise in temperature. This ensures that the $CO_2$ which is used as the second refrigerant is fed to the second delivery device 34, which is formed as a compressor, in the gaseous state.

The second refrigerant flowing through the portion of the second cooling circuit 20 which extends upstream of the second delivery device 34 is brought in the second heat exchanger 38 into thermal contact with the second refrigerant flowing through the portion of the second cooling circuit 20 which extends downstream of the cooling device 36. The refrigerant flowing through the portion of the second cooling circuit 20 which extends downstream of the cooling device 36 is therefore further cooled in the second heat exchanger 38 through heat transfer to the second refrigerant flowing through the portion of the second cooling circuit 20 which extends upstream of the second delivery device 34. The second refrigerant is therefore at the desired low temperature downstream of the second heat exchanger 38 in order to obtain in the first heat exchanger 18 the required cooling of the first refrigerant flowing through the first cooling circuit 16 of the cooling system 10.

Finally, a second reservoir 40 for temporarily storing the second refrigerant as well as a throttle valve 42 are disposed in the second cooling circuit 20 of the chiller device 12. The second reservoir 40 is positioned upstream of the second delivery device 34 in the second cooling circuit 20, while the throttle valve 42 is disposed downstream of the second heat exchanger 38. The second delivery device 34 can therefore deliver the second refrigerant which is temporarily stored in the second reservoir 40 from the second reservoir 40. The throttle valve 42 regulates the flow of the second refrigerant through the second cooling circuit 20. Moreover, the throttle valve 42 may also be used to control the pressure and therefore the evaporation temperature of the second refrigerant in the second cooling circuit 20.

FIG. 3 shows the refrigeration process control in a cooling system known from the prior art, for example DE 43 403 17 A1, in a pressure-enthalpy diagram using $CO_2$ as the first refrigerant. In the case of this cooling system known from the prior art a first cooling circuit is directly coupled to a central chiller device, so that the high pressure of approximately 95 bar occurring in the chiller device at an ambient temperature of approximately 30° C. is applied directly to a feed line of the first cooling circuit (points A, B). It is only in the region of a branch line which connects the feed line of the first cooling circuit to a corresponding cooling station that the pressure in the first refrigerant is reduced to a pressure of approximately 30 bar by the action of a throttle valve positioned in the branch line. Between a point C directly upstream of the cooling station and points D and E in the branch line downstream of the cooling station or the withdrawal line of the first cooling circuit the first refrigerant is converted to the gaseous state by a heat exchanger, which is formed as an evaporation device, of the cooling station. Finally, a rise in pressure to approximately 95 bar takes place in the first refrigerant upon flowing through the chiller device.

FIG. 4 is a representation of the refrigeration process control in a cooling system illustrated in FIGS. 1 and 2 in a pressure-enthalpy diagram using $CO_2$ as the first refrigerant. As is evident from a comparison of the diagrams in FIGS. 3 and 4, the pressure level in the first cooling circuit in the cooling system according to FIGS. 1 and 2 is distinctly lower than in the system known from the prior art. In addition, the process control in the system according to FIGS. 1 and 2 differs from the process control in the system known from the prior art in that the first cooling circuit of the system according to FIGS. 1 and 2 represents a right-hand cyclic process, i.e. a cyclic process running clockwise, whereas the cooling circuit in the system known from the prior art represents a left-hand cyclic process, i.e. a cyclic process running anticlockwise.

The invention claimed is:

1. An aircraft cooling system for cooling food on board an aircraft, comprising:
    a chiller device;
    a first cooling circuit adapted to feed cooling energy generated by the chiller device to at least one cooling station, wherein a first refrigerant circulating in the first cooling circuit is a two-phase, liquid gas, refrigerant, wherein the chiller device comprises a second cooling circuit formed separately from the first cooling circuit and is thermally coupled to the first cooling circuit via a first heat exchanger, wherein a second refrigerant circulating in the second cooling circuit is a two-phase, liquid-gas, refrigerant;
    at least one throttle valve;
    at least one evaporation device associated with the at least one cooling station, the at least one evaporation device arranged serially with the at least one throttle valve; and
    a first delivery device for circulating the first refrigerant in the first cooling circuit, wherein the first refrigerant flowing into the first delivery device is in the liquid state, wherein the first delivery device is arranged serially with the at least one throttle valve and the at least one cooling station, wherein the first delivery device circulates the first refrigerant in its liquid state to each of the at least one throttle valve solely through one or more duct lines, wherein the at least one throttle valve regulates a pressure of the first refrigerant upstream of the at least one cooling station and regulates an evaporation temperature of the first refrigerant in the at least one evaporation device converting the first refrigerant from the liquid to gaseous state when cooling energy is delivered to the at least one cooling station, and wherein the first refrigerant emerging from the at least one evaporation device returns to the liquid state again through appropriate pressure and temperature control in the first cooling circuit.

2. The aircraft cooling system according to claim 1, wherein the first delivery device is a pump.

3. The aircraft cooling system according to claim 1, further comprising a first reservoir for temporarily storing the first refrigerant disposed in the first cooling circuit.

4. The aircraft cooling system according to claim 1, further comprising a second delivery device for circulating the second refrigerant in the second cooling circuit disposed in the second cooling circuit.

5. The aircraft cooling system according to claim 1, wherein a cooling device is disposed in the second cooling circuit.

6. The aircraft cooling system according to claim 5, further comprising a second heat exchanger disposed in the second cooling circuit, wherein the second heat exchanger thermally couples a portion of the second cooling circuit which extends upstream of the cooling device to a portion of the second cooling circuit which extends downstream of the cooling device.

7. The aircraft cooling system according to claim 1, wherein a second reservoir for temporarily storing the second refrigerant is disposed in the second cooling circuit.

8. The aircraft cooling system according to claim 1, wherein the cooling station includes a third cooling circuit which is formed separately from the first cooling circuit and is thermally coupled to the first cooling circuit.

9. The aircraft cooling system according to claim 8, wherein the third cooling circuit is thermally coupled to the first cooling circuit via a third heat exchanger formed by the evaporation device.

10. An aircraft cooling system for cooling food on board an aircraft, comprising:

a chiller device;

a first cooling circuit adapted to feed cooling energy generated by the chiller device to a plurality of cooling stations, wherein a first refrigerant circulating in the first cooling circuit is a two-phase, liquid gas, refrigerant, wherein the chiller device comprises a second cooling circuit formed separately from the first cooling circuit and is thermally coupled to the first cooling circuit via a first heat exchanger, wherein a second refrigerant circulating in the second cooling circuit is a two-phase, liquid-gas, refrigerant, and wherein the first cooling circuit comprises a feed line, a withdrawal line and a plurality of branch lines, each branch line connecting one of the plurality of cooling stations to the feed line and the withdrawal line;

a throttle valve arranged in each branch line and upstream of the cooling station arranged in the respective branch line;

an evaporation device associated with the cooling station and arranged in each branch line serially with the throttle valve; and a first delivery device for circulating the first refrigerant in the first cooling circuit, wherein the first delivery device is arranged in the feed line downstream of the first heat exchanger and upstream of a first of the plurality of branch lines, and wherein the first refrigerant flowing into the first delivery device is in the liquid state, wherein the first delivery device circulates the first refrigerant in its liquid state to each throttle valve solely through the feed line and the respective branch line, wherein each throttle valve regulates a pressure of the first refrigerant upstream of the respective cooling station and regulates an evaporation temperature of the first refrigerant in the respective evaporation device converting the first refrigerant from the liquid to the gaseous state when cooling energy is delivered to the respective cooling station, and wherein the first refrigerant emerging from the evaporation device returns to the liquid state again through appropriate pressure and temperature control in the first cooling circuit.

* * * * *